May 12, 1931.  P. KRUSE  1,805,288
MACHINE FOR SEAMING CAN HEADS
Filed Feb. 23, 1929  5 Sheets-Sheet 3

INVENTOR:
Peter Kruse,
By Attorneys,

INVENTOR:
Peter Kruse,
By Attorneys,

Patented May 12, 1931

1,805,288

UNITED STATES PATENT OFFICE

PETER KRUSE, OF BROOKLYN, NEW YORK, ASSIGNOR TO E. W. BLISS COMPANY, OF BROOKLYN, NEW YORK, A CORPORATION OF DELAWARE

MACHINE FOR SEAMING CAN HEADS

Application filed February 23, 1929. Serial No. 342,046.

This invention relates to machines for seaming heads or ends on cans or can bodies and aims to provide improvements therein.

The machine provided by this invention may be used for seaming the heads of round cans, and is particularly adapted for seaming the tops or covers on cans already filled, but it is nevertheless adaptable for applying the bottoms to can bodies.

One special object of the invention is to provide a more compact arrangement of parts in a multiple spindle seamer whereby a plurality of seaming heads may simultaneously act upon the ends of cans without the necessity of separating such cans by the distance hitherto required in such operation. This object is attained primarily by synchronizing the rotation of the several seamer heads and so relating their spacing and angular relationship that one rotates partially within the orbit of another, but without any mechanical interference between them. That is to say, the orbits of the seaming heads intersect, but their respective parts are so staggered as to escape actual contact, just as loosely fitting gears might be rotated together. This more compact arrangement of the seaming heads is particularly advantageous in seaming the tops on filled cans at comparatively high speeds. It will be obvious that in reducing the distance which it is necessary to separate cans in order to feed them in properly spaced relationship to the separate seaming heads, the difficulty of spillage from the filled cans is correspondingly reduced. In high speed seaming machines the acceleration required to separate the cans a sufficient distance to feed them successively to the seaming heads has frequently resulted in spilling a certain part of the contents of the can, particularly when the contents of the can is fluid and the can is well filled. The closer spacing of the seaming heads permitted by the construction according to the present invention reduces this necessary acceleration and consequently greatly lessens the spilling of the contents of the can.

The novel arrangement of the seaming heads according to the present invention involves certain changes in the drive for such heads and the means for delivering the cans to such heads, and these changes constitute a further object of the invention, together with the general constructional features of the machine, as will hereinafter be more fully set forth.

In the mechanism according to the present invention, the can, with its top in place, is held stationary relative to the axis of the seamer head which acts upon it, and is seamed by seamers or seaming rolls which revolve around it, and which, while so revolving, gradually close in upon it. The cans to be seamed are, in the preferred construction, carried to a spacing table where they are successively accelerated and thus automatically separated one from another by a distance equal to the axial distance of the seaming heads, the cans thus separated being delivered to a conveyor system which carries them into position beneath the seaming heads. The can thus placed is then lifted by a plunger to bring its top into the plane of the seaming rolls and is held there during the seaming operation, after which it is lowered and the finished can is carried out of the machine. During the seaming, the can is gripped by clamping disks to hold it stationary relative to the axis of the seaming heads while the seaming rolls revolve around it. The covers or tops are fed automatically from a stack and carried to the seaming position, each can receiving its cover as it rises to the seaming level.

The progress of the cans through the machine is continuous, and once the required velocity has been imparted to a can at the spacing table, such can travels thereafter at a uniform speed through the machine, the cover being applied and securely seamed to the can while such can is moving at the uniform velocity determined by the speed of the machine.

The accompanying drawings show a machine constructed according to the preferred embodiment of the invention, wherein.

Referring to the drawings 1 designates a fixed upright column which affords a support for the various parts of the rotary seaming mechanism. At the upper end of this column a rigid frame or casing 2 is secured, this casing being generally cylindrical in form and carrying cylindrical extensions 3, 4, which, together, extend downwardly a sufficient distance to completely enclose the rotating parts of the seaming heads and the mechanism through which they are driven.

It will be borne in mind that the seamer heads must receive two rotary motions at the same time, one of these being a comparatively slow, orbital movement about the central column 1, whereby the heads are advanced at the linear speed corresponding to the determined rate of movement of the cans through the machine; and the other a comparatively high-speed rotation about their own axes, the latter rotation being required to roll or form the seam at the top of the can. This compound movement of the seaming heads is the usual planetary motion characteristic of multiple spindle seamers.

Figure 6:
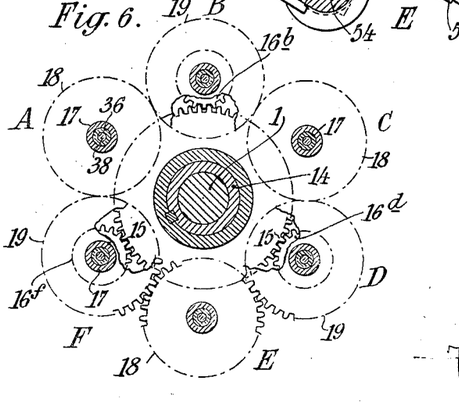
Fig. 6 is a detailed plan view of the gear drive for the seaming heads, the spindles being shown in section, taken along the line VI—VI of Fig. 1.

The high-speed rotation of the six seaming heads A to F inclusive, which are symmetrically disposed about the central column 1, is obtained through the following driving connections: Power applied to the pulley 10 is transmitted through a horizontal shaft 11 to a bevel gear 12 in mesh with a horizontal bevel gear 13 secured at the lower end of a sleeve 14, which surrounds and is freely rotatable upon the stationary column 1. At the upper end of this sleeve a gear 15 is secured, this gear meshing with three pinions $16^b$, $16^d$, $16^f$, which are secured respectively upon the driving spindles 17 of the seaming heads B, D and F respectively. These three seaming heads are thus rotated in the same direction. The seaming heads A, C and E, which alternate with the heads B, D and F, are rotated oppositely to the latter heads, the spindles of the said seaming heads A, C and E being driven through gears 18, which gears mesh with driving gears 19, which are secured to the spindles 17 driven by gear 15 and pinions $16^b$, $16^d$ and $16^f$, as hereinbefore described. As will be seen in Figs. 1 and 6, the disposition of the three gears 18 and three alternate gears 19 is such that the teeth of each meshes with the teeth of the gears adjoining it on either side. In this manner the synchronous rotation of the six spindles carrying the seaming heads A to F inclusive is insured, alternate heads rotating in opposite directions but at the same speed. It will be apparent that the provision of one pinion, such as $16^b$, meshing with gear 15 would be sufficient to impart motion to the train of gears 18, 19. But three pinions have been provided in order to distribute the driving force more uniformly throughout the said gear train.

The low-speed orbital movement of the seaming heads about the column 1 is obtained through driving connections comprising a bevel pinion 25 secured upon a shaft $25^a$ paralleling the pulley-driven shaft 11, and driven by the latter through gears $25^b$, $25^c$, the said pinion 25 on $25^a$ meshing with a bevel gear 26 which is rigidly carried at the lower end of a tubular column 27. This tubular column encloses and is freely rotatable upon sleeve 14 surrounding the stationary column 1. At two or more points along the hollow column 27, spindle-supporting frames or spiders 30, 31 are rigidly secured, the six spindles of the seaming heads A to F inclusive being journaled in such frames in any suitable manner.

Below, and in axial alignment with each of the seaming heads, is a plunger or so-called pad 33 which supports a can A' while the top is being seamed thereto by the seaming heads. These pads are carried by a frame 34 which is secured to the slowly revolving column 27, and consequently revolve in unison with the orbital movement of the seaming heads. The construction and operation of such pads for presenting cans to the seaming heads is well understood in the art and need not be described in detail. In accordance with usual practice, any suitable actuating means may be provided to cause the pads to rise, dwell, and fall, so that a can may be received below the level of the seaming head, thrust upwardly, and caused to remain up at the proper level to be seamed by the action of the head, and thereafter lowered so that the finished can may be carried transversely off the pad without interference from the seaming head. A can is received by one of the pads, a top applied and seamed thereto, and the finished can is discharged from the pad while the latter executes somewhat less than one revolution in its orbital movement about supporting column 1, as will hereinafter more fully appear.

While the top is actually being seamed to the can by the action of the seaming head, the can A' and top are rigidly gripped between the pad 33 and a chuck or disk 35 which is carried at the lower end of a tubular support 36 extending upwardly through the seaming head spindle 17, and which is rigidly secured at its upper end in a member 37 forming a part of the rotating frame 30. Within the tubular support 36 of disk 35 is guided a vertically-slidable knock-out rod 38, the lower end of which, projecting through disk 35, carries a flattened head 39. Rod 38 at its upper end carries a rigid head 40 which is resiliently held in contact with a cam track 41 formed on the inner surface of housing 2, by means of a spring 42 interposed between frame member 37 and the aforesaid head 40 of knock-out rod 38. The cam track 41 is so designed as to depress the knock-out rod against the action of spring 42 after the completion of the can-seaming operation in order to insure the ejection of the can, the top of which, because of the rolling-in of the seaming rolls, usually adheres to the disk 35. Such downward movement is essential to permit the can to escape transversely from the seaming head. Such movement of the knock-out rod should occur practically simultaneously with the lowering of the pad 33 upon which the can A' is carried during the seaming operation, and which pad, as hereinbefore set forth, is automatically lowered after the completion of such operation.

Figure 1:
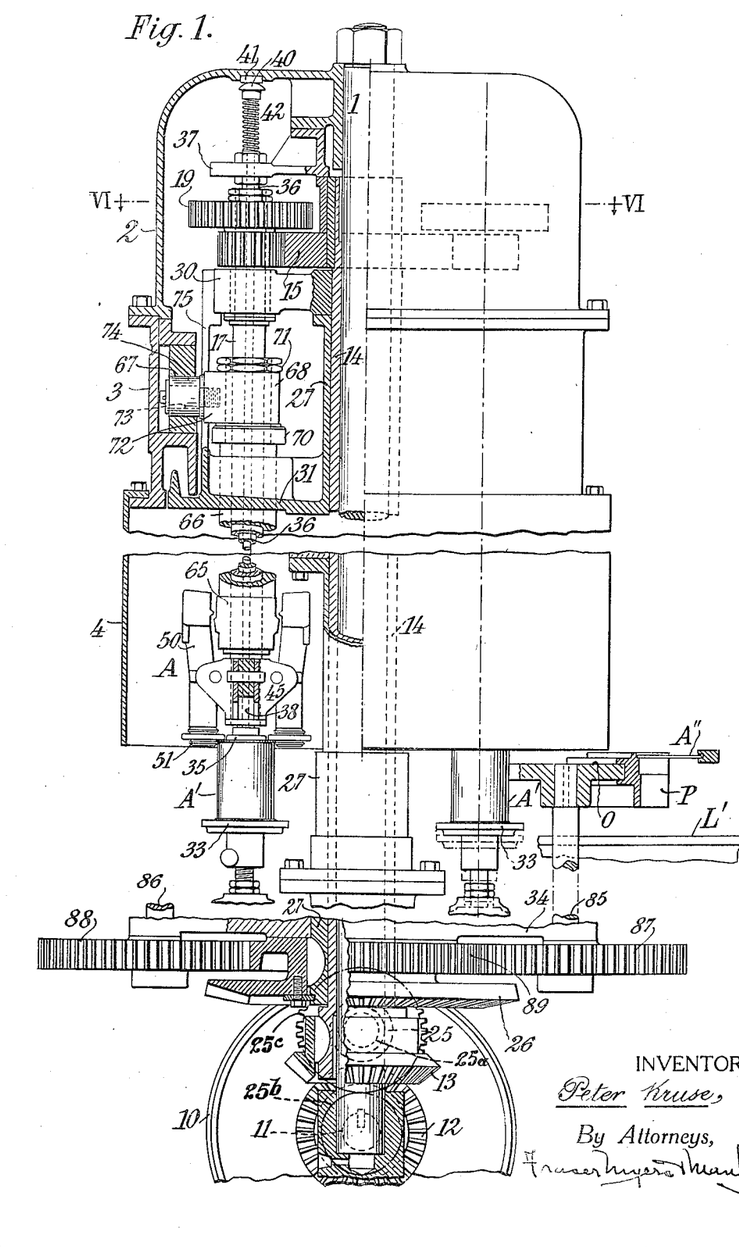
Figure 1 is a side elevation of the multiple spindle seaming mechanism, the left half of the figure showing a vertical axial section through the central supporting column and one of the seaming heads.
Figure 3:
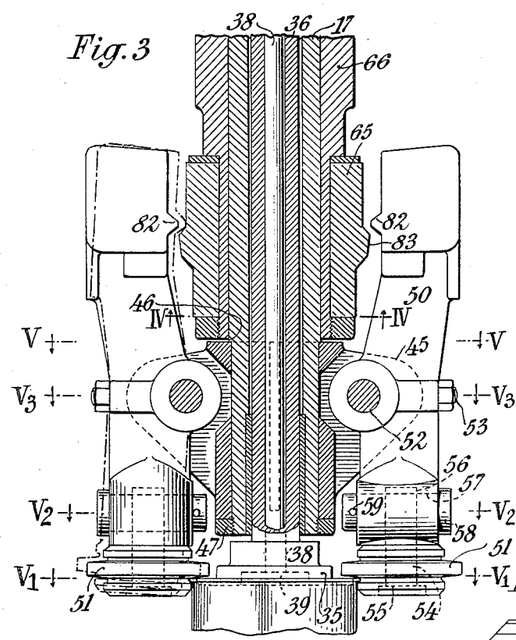
Fig. 3 is an enlarged axial section of one of the seaming heads.
Figure 5:
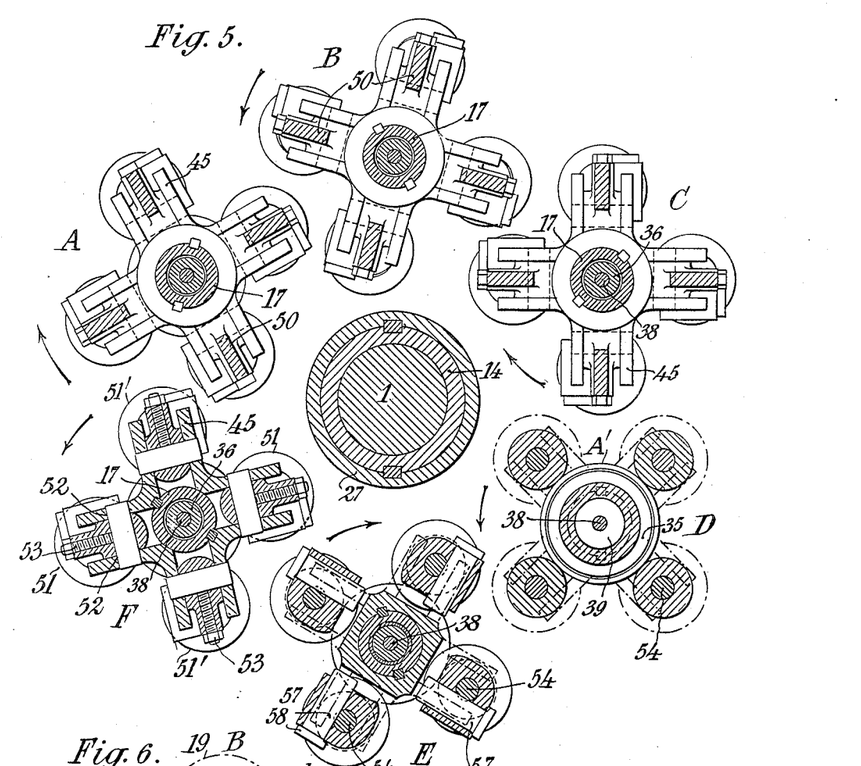
Fig. 5 is a plan and partially sectional view of the six seaming heads, showing their spacial and angular relationships. The sectional view of heads A, B and C in the upper half of this figure is taken along the line V—V of Fig. 3; the section of head D along the line $V_1$—$V_1$ of the same figure; the section of the head E is taken along the line $V_2$—$V_2$ of the same figure; and the section of head F is taken along the line $V_3$—$V_3$ of the same figure.
Figure 10:
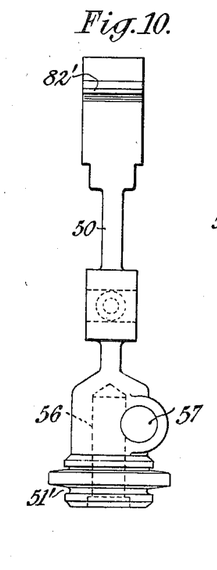
Fig. 10 is an elevation of one of the pair of seaming roll levers which does not appear in the sectional view of Fig. 3.
Figure 11:
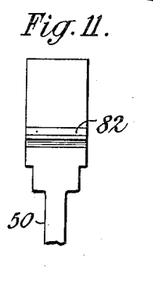
Fig. 11 is a corresponding fragmentary view of the upper end of the levers appearing in Fig. 3.

Since the seaming heads and the means for supporting and actuating them are all alike, the description of one applies to all. Details of one of the seaming heads are best seen in Figs. 1, 3 and 5. The head proper consists of a cruciform frame 45 which is rigidly secured upon the lower end of the hollow driving spindle 17, the end of such spindle being reduced somewhat in diameter to provide a shoulder 46 against which the frame 45 is clamped by means of a nut 47 threaded onto the end of spindle 17, which projects slightly below frame 45. The four arms of the frame are slotted to receive the levers 50, which carry the seaming rolls 51, 51', at their lower ends. Extending transversely through each lever is a fulcrum pin which is journaled at both ends in the walls of the frame arms, as best seen at 52 in Fig. 5. The pins are held in place by set screws 53 threaded through the levers 50 and bearing against the pins. The seaming rolls 51, 51', are mounted so as to be freely rotatable upon pins 54 secured in the lower ends of the levers, the pins being provided with enlarged heads 55 which retain the rolls. In order to facilitate the replacement of the rolls, the pins 54 are merely slipped into closely fitting bores 56 in the lower ends of the levers, the pins being retained in such bores by means of transverse, round keys 57 which pass through the levers, the keys being held in position by heads 58 at one end, and cotter pins 59 at the other. As best seen in Fig. 10, the keys pass through the levers so as to enter arcuate notches 60 formed in the sides of pins 54 and thus effectively lock such pins against longitudinal or angular movement.

Figure 4:
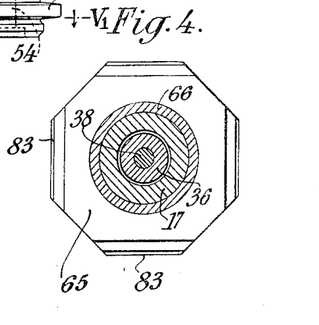
Fig. 4 is a transverse cross-section taken along the line IV—IV of Fig. 3.

The mechanism for causing the seaming rolls 51, 51', to move radially of the can whereby they gradually close in upon the end of the can, and by virtue of their rotation seam the top to the body of the can, and thereafter move radially outward so as to release the can or can body upon the completion of the seaming operation, will now be described. In accordance with usual practice in the class of machines known as "double seamers", it is desirable to perform the seaming operation in two successive stages by means of separate seaming rolls. Where four rolls are employed, as in the present construction, two diametrically-opposed rolls 51' are first moved inwardly to engage the can top and partially form the seam, the inward movement of such rolls being then followed by the inward movement of the second pair of opposed rolls 51 by which the seaming operation is completed, in accordance with practice well understood in the art, all four rolls thereafter moving radially away from the top of the can in order to permit the ejection of the can or can body and the introduction of the succeeding one. The above described movement of the seaming rolls toward and away from the top of the can is effected by means of a vertically-slidable cam or wedge-block 65 which lies between the upper ends of the levers 50 which carry the seaming rolls. A vertical cross-section and bottom view of this wedge-block are shown respectively in Figs. 3 and 4. This wedge-block is secured upon the lower end of a sleeve 66 surrounding the driving spindle 17, the said sleeve being slidably keyed to said spindle so as to positively rotate therewith and in fixed angular relationship with respect to the levers 50, which are also rotated by said spindle, as hereinbefore set forth. The vertical movement of wedge-block 65, whereby the actuation of levers 50 carrying the seaming rolls is controlled, is determined by a stationary annular cam track 67 formed on the inner wall of stationary casing 2, as shown in Fig. 1, the upper end of said sleeve 66 being engaged by a collar 68 within which the sleeve freely rotates, but which collar is capable of imparting axial motion to the sleeve through its engagement with a flange 70 and nut 71 carried by said sleeve, and between which, collar 68 is embraced. The collar carries at the end of its radially-outward projection 72, a stud 73, upon which cam roller 74 is rotatably mounted, the said cam roller lying within the walls of cam track 67. The collar 68 is prevented from rotating with sleeve 66 which it surrounds and the vertical movement of which it controls, by means of vertical guides 75 which closely embrace the projection 72 of the collar and provide between them a guideway in which the collar may be vertically reciprocated by the action of cam roller 74 running in cam track 67. The guides 75 are rigidly secured to the frames or spiders 30, 31, which provide a support for the seaming head spindles.

The contour of cam track 67 is so designed and related to the orbital movement of the seaming heads about the stationary supporting column 1, as to cause wedge-block 65 to gradually descend immediately after the seaming head has reached the angular position where it receives the can or can body, and the top to be seamed thereto. This position is indicated by arrow G in Fig. 2. The descent of wedge-block 65 gradually moves the upper ends of levers 50 outwardly, thereby causing the seaming rolls, 51, 51', to close in upon the can, and roll-in or form the seam in a manner well understood. Upon the completion of the seaming operation, which occurs when the seaming head in its orbital movement reaches the angular position approximately indicated by arrow H in Fig. 2, the contour of cam track 74 is such as to cause a comparatively rapid rise of wedge-block 65 whereby the upper ends of levers 50 are permitted to move inwardly, the lower ends thereby being swung radially away from the can and thus carrying the seaming rolls 51, 51', outwardly a sufficient distance to permit the can to drop from between them upon the lowering of supporting pad 33 and be carried away from the machine.

No special means are required to carry the seaming rolls outwardly after the completion of the seaming operation, this being accomplished in the usual manner by simply designing the assembly of levers 50 so that the preponderant mass is below the pivotal axis 52, centrifugal force then acting to carry the lower ends of the levers radially outward when such movement is permitted by the lifting of wedge-block 65 by the cam mechanism hereinbefore described.

In order to cause one pair of seaming rolls to act in advance of the other whereby the first and second steps in the seaming operation are performed, wedge-engaging projections 82' are formed toward the upper ends of the pair of seaming-roll levers which are to be actuated first, these projections being disposed somewhat above the level of the corresponding projections 82 of the said second pair. The disposition of the projections 82' is shown in Fig. 10, which also illustrates the form of seaming roll which acts first, such roll being indicated at 51'. It will be apparent that in the descent of the wedge-block, lever projections 82' will be engaged first, and thereafter projections 82, and in this manner rollers 51' and 51 will be successively brought into action.

The construction of the seaming heads according to the present invention is such as to permit the ready adaptation of the machine to the seaming of cans of various sizes. The machine may be adapted to seam any size of can between the usual one and two pound containers, for example, by simply replacing the seaming roll levers 50 with others which carry their seaming rolls at a different distance radially from the axis of the seaming head spindle. It will furthermore be apparent that any type of seaming roll may be employed to make any desired kind of seam, the replacement of the seaming rolls being simply accomplished in the manner hereinbefore described.

Figure 2:
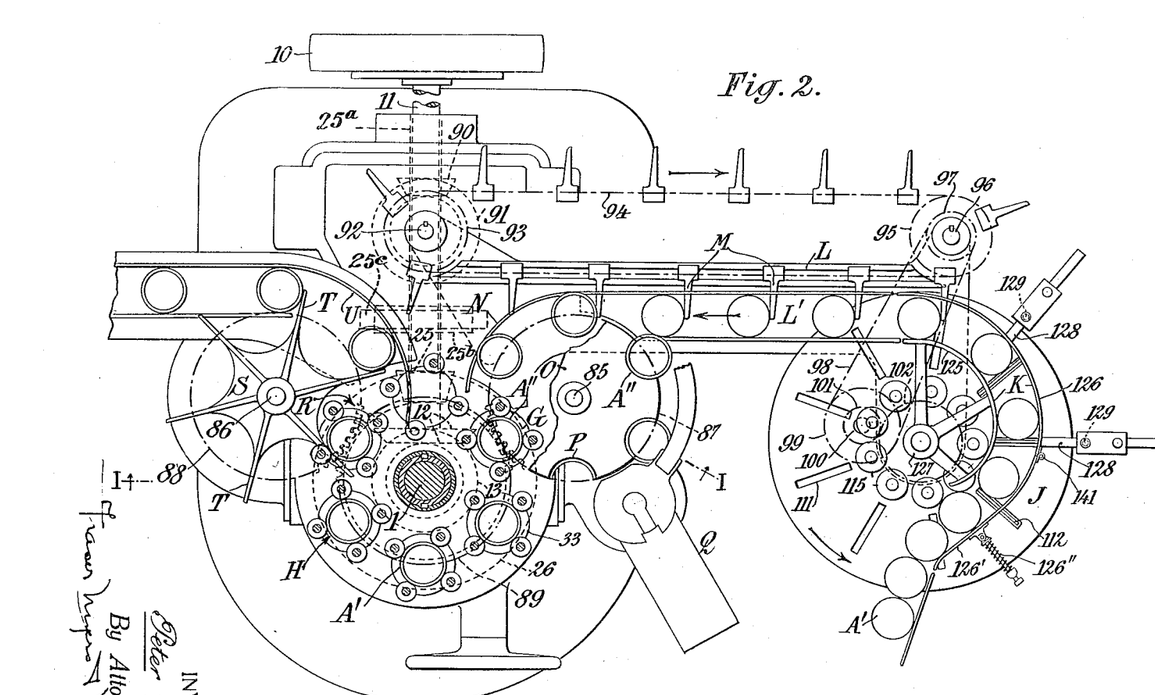
Fig. 2 is a diagrammatic plan view of the entire machine.

The progress of the cans or can bodies through the machine is best illustrated in Fig. 2, wherein the solid line of cans is shown entering at the lower right part of the figure. The cans pass first to the rotary spacing table J, which, in carrying the cans through an arc of approximately 180° along a spiral track K, effects a separation of the cans by progressively accelerating them so that they are delivered by the rotation of the spacing table or parts associated therewith, to an endless conveyor L which continues to advance the cans along a stationary slideway L' at substantially the same linear velocity imparted thereto by the aforesaid spacing table. Toward the left-hand end of the conveyor, the cans are engaged by the notched driving head O of the usual rotary feed.

After each can is moved by the conveyor into a notch or pocket P of the driving head, the can laterally engages an arcuate guide N which holds it securely in the driving pocket until such can is delivered to one of the pads 33 of the seaming-heads. The driving head O does not support the can but simply continues to slide the latter along an extension of slideway L' until it passes onto a pad 33.

The peripheral speed of head O is such as to present the successive cans to the seaming heads in exact axial alignment therewith.

In a manner well understood, can tops A″ are automatically fed by feeding mechanism Q onto the head O at positions above the pockets P occupied by the cans when the latter are delivered thereto by conveyor L. When a can has been brought into axial alignment with the seaming head which is to operate upon it, it is thrust upwardly by the pad 33 of the seaming mechanism hereinbefore described, picking up the top A″ which has been carried around with it by the feed-head O, the can with its top loosely applied being then in position to be operated upon by the seaming head as hereinbefore described. Prior to the engagement of the seaming rolls with the top of the can, the can is securely clamped between the disk or chuck 35 and pad 33 (Fig. 1), and in this manner is carried around in the orbital movement of the seaming head from the angular position indicated by arrow G to the position indicated by arrow R. At this point the seaming of the can having been completed, and the pad 33 upon which the can is supported having been lowered so as to free the can from the seaming rolls, the can is engaged by one of the fingers of a rotary ejector wheel S and thereby carried off the pad 33 and away from the seaming mechanism. The driving fingers T of the ejector wheel propel the finished cans along an arcuate slideway U, along the extension of which the cans are collected, ready to be packed or to have other operations performed upon them.

The synchronous rotation and proper timing of the several devices hereinbefore referred to for feeding the cans to the seamer and carrying them away therefrom is insured by direct driving connections, which will now be described. The vertical driving shafts 85, 86 of feed head O and ejector wheel S, rigidly carry respectively at their lower ends, gears 87, 88, which mesh directly with a gear 89 which is formed integrally with bevel gear 26, through which latter gear, as hereinbefore described, the orbital movement of the seaming heads about column 1 is directly obtained, bevel gear 26 being rigidly secured at the lower end of tubular column 27 which carries the frames 30, 31 supporting the seaming head spindles. The simplest arrangement is had by making the gears 87, 88 and 89 all the same size. In this manner the feed head O, the seaming mechanism comprising seaming heads A to F inclusive, and the ejector wheel S, will be rotated through one revolution in the same time. There being six seaming heads in the preferred construction, there will, of course, be six notches P in the driving disk of feed head O and six ejector fingers T of ejector wheel S.

Figures 7, 8, 9:
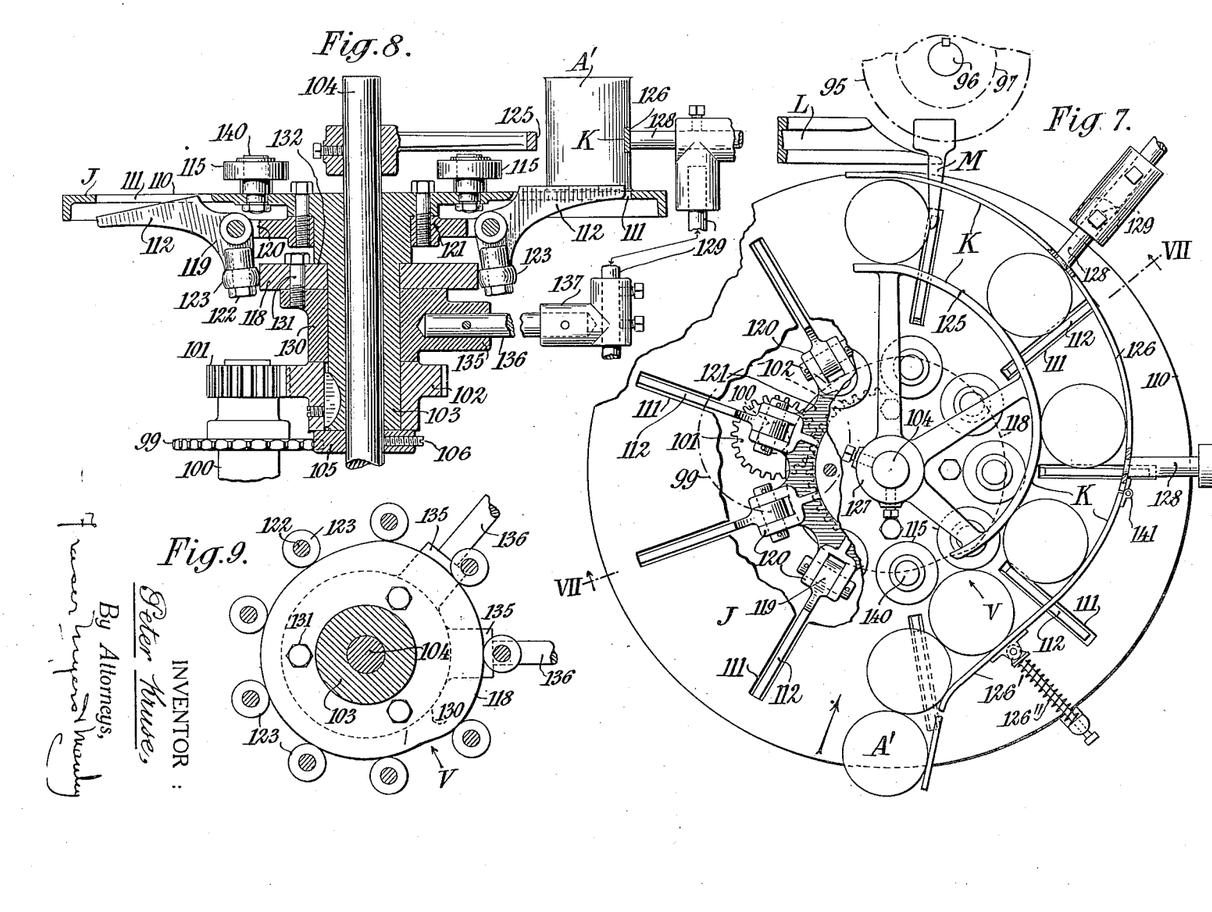
Fig. 7 is a plan view of the spacing table, a fragment being broken away to show parts of the mechanism beneath.
Fig. 8 is a vertical, axial section taken along the line VII—VII of Fig. 7.
Fig. 9 is a detailed plan view of the cam ring controlling the elevation of the driving fingers carried by the spacing table shown in Fig. 7.

The endless conveyor is positively driven at the appropriate feeding speed by a bevel pinion 90 (Fig. 2) keyed upon the horizontal drive shaft 11, this pinion meshing with a bevel gear 91 secured upon the lower end of a vertical shaft 92 which carries at its upper end a sprocket 93. This sprocket is engaged by the chain 94 of the conveyor, along which at appropriate intervals the conveyor fingers M are disposed. The conveyor chain at its right hand end, as shown in Fig. 2, is carried around a sprocket wheel 95 and affords a drive for the mechanism of the spacing table J, the said sprocket being secured at the upper end of a vertical shaft 96 which also carries a smaller sprocket 97 below sprocket 95. A chain 98 transmits the motion of sprocket 97 to a sprocket 99 secured upon a vertical shaft 100, which shaft, at its upper end, carries a pinion 101 meshing with a gear 102 which is directly connected to the vertical shaft 103 of the spacing table, the details of which are best seen in Figs. 7, 8 and 9.

The spacing table J is rotatably mounted upon a vertical supporting shaft 104, the downwardly-extending hub portion of the rotating table constituting the hollow shaft 103, which carries toward its lower end the gear 102 previously referred to. The height of the table J is regulated by the adjustable collar 105 secured to the supporting shaft 104 by set screw 106, the said collar providing a thrust bearing for the lower end of the hub portion constituting the hollow shaft 103 of table J.

The upper surface of spacing table J comprises a smooth disk 110 through which are cut a plurality of radial slots 111, there being nine of these in the construction illustrated. These slots are adapted to receive vertically-reciprocating driving fingers 112, by means of which the cans A′ are propelled along the stationary spiral guideway K, as will hereinafter more fully appear. Since the cans are delivered in a solid line moving in the direction of the arrow in Fig. 7 and are in actual contact one with another, it would be impossible to introduce the feed fingers 112 between successive cans until they had been somewhat separated. This preliminary separation of the cans is obtained by the wedging action of separating rollers 115 presently to be described. After the cans have been slightly separated by such rollers, the driving fingers 112 are raised behind each can and thereafter propel it along the spiral guideway K until the can is delivered to the endless conveyor L.

The fingers 112 are caused to disappear below the surface of the spacing table J and to rise at the appropriate time behind the cans by a stationary cam 118. Each finger constitutes the upper arm of a bell-crank 119 pivoted in radially-projecting forks 120 formed on a disk 121 which is rigidly secured to the hub portion of the rotating table J. Upon a stud 122 secured at the end of the downwardly-projecting arm of each bell-crank 119 a cam roller 123 is rotatably mounted, the said roller engaging the peripheral surface of cam 118. The contour of this cam is formed, as shown in Figs. 7 and 9, so as to cause a radially-outward movement of each bell-crank 119 as it reaches the angular position indicated by arrow V, thus causing the arm 112 constituting the driving finger to rise behind a can and propel the same along the guideway K. After each driving finger has carried a can to the position where the latter is engaged by a finger M of the endless conveyer, the finger is caused to disappear beneath the surface of the table, the radius of the cam 118 being reduced, as shown, over the remainder of its contour, to permit the inward movement of the cam roller and consequent lowering of the driving finger.

The spiral guideway K consists of two stationary guide rails 125, 126, which are respectively supported above the surface of the spacing table J by means of a spider 127 rigidly secured to the stationary central column 104, and supports 128 adjustably secured at the upper ends of stationary rods 129, which are secured in any suitable manner to the frame of the machine. The contour of the guideway K provided between rails 125, 126, is such as to cause a gradual radial movement of the cans outwardly from the center of the spacing table J as the cans are moved therealong by the fingers 112. While such fingers advance the cans at a uniform angular rate about the axis of the table, it will be apparent that as the cans move radially outward they will be separated one from another by greater distances because their angular separation of 40° determined in the particular construction described by the fact that the table J carries nine equally spaced feed fingers, will result in a much wider separation of the cans at the outer radius to which they are carried by the spiral guideway than at the shorter or inner radius where such cans enter the guideway. This results in a progressive acceleration of the cans as they move along the guideway such that the cans are separated by the required distance to be continuously fed into the seaming mechanism. The acceleration required is very much less than has hitherto been necessary because of the fact that it is possible to dispose the seaming heads, according to the present invention, in a very much more compact arrangement. The required spacing of the cans is only two-thirds of that ordinarily required in multiple spindle seamers, this resulting in a reduction of the acceleration of the cans to a point where the difficulty of spillage of the liquid contents of the cans is practically eliminated.

The cam 118 controlling the movement of fingers 112 which advance the cans along the spiral guideway, has been herein described as a stationary cam. The construction by which this cam is held in a fixed position is as follows: The cam disk 118, together with a collar 130 to which it is clamped by screws 131, fit freely upon the hub portion 103 of revolving table J, so that the latter is permitted to rotate within these parts. The said cam disk and collar are held against axial displacement, being engaged respectively between a shoulder 132 on hub 103, and gear 102 secured at the lower end of such hub portion. Within two radially-projecting bosses 135 formed on collar 130 are secured rods 136, which, at their radially-outward ends, are anchored in fittings 137 rigidly carried by the upright frame rod 129. In this manner the cam disk 118 is held motionless while the spacing table assembly revolves around it.

The separating rollers 115 which effect the preliminary separation of the cans by a sufficient distance to permit the introduction of driving fingers 112 are arranged in a circle concentric with the axis of the spacing table, and at such a radius as to cause them to penetrate the path of the cans as the latter enter the spiral guideway K, by a sufficient distance to wedge the cams apart by somewhat more than the width of the driving or feed finger 112, which must rise between them. The separating rollers are rotatably carried upon studs 140 rigidly secured upon the upper surface of spacing table J, each of the nine rollers being preferably in radial alignment with a driving finger 112. The angular separation of the rollers is such as to insure their free entrance between adjacent cans in the feed line when the cans are fed to the table in contact with each other, as will ordinarily be the case. If a gap should occur between cans that are delivered to the spacing table, there is the possibility of one of the rollers engaging the side of the can at such an angle as to cause the latter to be jammed between the roller and the leading section 126' of guide rail 126. In order to prevent damage to the can, this section of the guide rail is resiliently hinged to the succeeding section 126 at 141, the leading section of the rail being yieldingly held in contact with the cans by a spring 126''. If a can does jam between one of the rollers 115 and the rail section 126', the section will momentarily yield, thus permitting relative movement between the roller and can whereby a stoppage will be avoided, the roller running ahead of the can and causing it to fall back into normal relationship with the next succeeding roller.

The operation of the machine has been quite fully set forth in the foregoing description and therefore will again be but briefly summarized. The line of cans is carried by any suitable means to spacing table J, where, through the action of spacing rollers 115, the cans are introduced in properly spaced relationship between the guide rails of spiral guideway K so as to be engaged by disappearing driving fingers 112 which rise behind each can as it moves into such guideway. The action of the spacing table and spiral guideway associated therewith is such as to separate the cans in the course of approximately a half revolution of the table, by the distance which the cans are required to be separated in order to be carried at a substantially uniform velocity into the continuously rotating seaming mechanism, and so that each can is presented to a seaming head in correct axial alignment therewith. From the spacing table the cans are carried along a horizontal slide L' by driving fingers M carried by an endless chain conveyor L, the said fingers M being so placed along the chain as to preserve the correct center line distance of the cans as determined by the spacing table. The endless conveyor delivers the cans to a rotating feed-head O having pockets or notches P to receive the cans at the correct intervals. An automatic top feeding mechanism Q delivers can tops A'' to said feed-head, the cans, with their tops in proper axial alignment, being delivered by the rotation of the said head into the position where the can and top are gripped together and securely held in position to be seamed by one of the seaming heads. The gripping of the can and its top is accomplished by the elevation of pad 33 onto which the can is fed, the can being thereby pressed into engagement with a chuck or disk 35 concentric with the seaming head. Thus gripped, the can and top are in correct position to be acted upon by the seaming rolls, and the seaming operation is carried out while the can continues to be advanced by the general orbital movement of the seaming head about the central supporting column 1. The two stages of the seaming operation are performed by the successive closing in of the two pairs of seaming rolls, which closing in movement is controlled by the downward movement of wedge-block 65, this movement being determined by the action of the annular can 67. After the completion of the two stages of the seaming operation, the wedge-block is lifted, thus freeing the rollers from the finished can, the can then being depressed by the action of knock-out rod 38 and the depression of pad 33. The can at this moment being free from the seaming rolls, is engaged by one of the fingers of ejector wheel S and carried off the pad and ejected along a carrying-off slideway U. It will be observed that once the line of cans has been brought up to the required speed by the accelerating action of spacing table J, the cans move through the machine at a substantially uniform linear speed, there being no material alteration in this continuous movement as the cans are propelled first by the endless conveyor L, then by the feed-head O, then by pads 33 rotating with the orbital movement of the seaming heads, and finally by ejector wheel S.

The operation of the seaming heads resulting from the novel compact grouping according to the present invention, has been hereinbefore fully set forth. It is this feature which permits of seaming a line of cans at higher speeds than has hitherto been possible, because of the material reduction in acceleration necessary to feed filled cans in properly spaced relationship to be acted upon by the closely spaced seaming heads.

It will be understood that the mechanism hereinbefore described and as set forth in the following claims is adapted to apply the ends or covers to open can bodies, as well as to apply the tops to filled cans, and may also be used to perform end-seaming operations on any cylindrical body other than that of a can. In the following claims, where reference is made to the "tops" which are applied to the cans or can bodies, this expression will be understood to mean the cover which may be applied to either end of the can. The term "cans" includes can bodies.

While only the preferred embodiment of the seaming mechanism according to the present invention has been described and illustrated in the accompanying drawings, it will be understood that the invention is not limited thereto but may be otherwise variously modified and embodied without departing from the spirit thereof, as set forth in the following claims.

What I claim is:

1. A machine for seaming tops on cans or the like, said machine comprising a plurality of rotary seaming-heads, means for carrying said heads progressively through an orbital path, and driving means adapted to synchronously rotate adjacent seaming-heads in opposite directions.

2. A machine for seaming tops on cans or the like, said machine comprising a plurality of rotary seaming-heads, a rotatable support for said heads, the axes of said heads being disposed at a distance one from another less than the diameter of their respective orbits, and driving means adapted to rotate adjacent heads oppositely but at the same speed, the angular relationship of the heads being thereby so controlled that parts of one may be rotated through a portion of the orbit of another without mechanical interference between them.

3. A machine for seaming tops on cans or the like, said machine comprising a plurality of rotary seaming-heads, means adapted to impart a planetary movement to said heads about a common axis, adjacent heads being oppositely rotated, the axes of said heads being disposed at a distance one from another such that parts of one head rotate about its axis partially within the orbits of parts of adjacent heads in rotating about their axes.

4. A machine according to claim 3 comprising a plurality of spindles for rotating said heads, and a gear on each of said spindles, the said gears being meshed to form an endless gear train.

5. A machine for seaming tops on cans or the like, said machine comprising a plurality of rotary seaming-heads, spindles for rotating said heads, a rotary turret carrying said spindles, and a gear on each of said spindles, the latter being arranged at equal angles about the axis of the turret and at such distances as to permit the meshing of said gears so as to form an endless gear train.

6. A machine for seaming tops on cans or the like, said machine comprising a plurality of rotary seaming-heads, spindles for rotating said heads, a rotary turret carrying said spindles, a gear on each of said spindles, the latter being arranged at equal angles about the axis of the turret and at such distances as to permit the meshing of said gears so as to form an endless gear train, a driving gear coaxial with the said rotary turret, and a pinion mounted on at least one of said spindles and driven by said driving gear.

7. The machine according to claim 6, further characterized in that an even number of seaming heads and spindles are arranged about the turret, alternate spindles each carrying a pinion meshing with said driving gear whereby power will be applied to the said endless gear train at a plurality of points separated by equal distances.

8. A machine for seaming tops on cans or the like, said machine including a series of seaming heads, each of said heads adapted to independently perform the end seaming of a can, each of said heads comprising at least one pair of seaming rolls, and means adapted to rotate adjacent heads in said series in opposite directions but at the same speed, the rotational axes of said heads being substantially parallel and separated by a distance less than the diameter of the outermost circle generated by the rotation of said seaming rolls about the axes of their respective heads, and the angular movement of the heads being so related as to permit each of the rolls of one head to rotate between the rolls of adjacent heads.

9. The machine according to claim 8, further characterized in that the seaming heads include cruciform frames, the arms of which are slotted, the said seaming rolls being rotatably carried at the ends of levers which levers are received by said slotted arms and are pivoted therein, the said cruciform frames being so formed and their rotation so related that the arms of each frame rotate between the arms of the adjacent frame so as to permit a more compact arrangement of the heads.

10. In a machine for seaming tops on cans, a guideway along which cans are fed and spaced apart, a plurality of disappearing driving elements moving about a common axis to propel the cans along said guideway and movable independently into and out of driving relationship with said cans, the guideway being disposed so as to cause the cans to move outwardly from the said axis as they are propelled therealong by the said driving elements, a series of separating members rotating with said driving elements and moving through an arc which penetrates the line of cans as the latter are fed to said guideway, whereby the said members effect a preliminary separation of the cans sufficient to permit the introduction of said driving elements therebetween, and means acting in timed relationship with the rotation of said driving elements about the said common axis to cause said elements to enter between cans which have been separated by the said separating members.

11. The machine according to claim 10, further characterized in that a central cam means is provided to actuate the said disappearing driving fingers, the said fingers in their rotation about said cam means being caused to move between the cans after the latter have been preliminarily separated by the said separating members.

12. The machine according to claim 10, further characterized in that the said separating members consist of freely rotatable rollers, a rotatable platform being provided to receive the cans, the said rollers being mounted on said platform in a circle concentric with the rotational axis thereof.

13. The machine according to claim 10, further characterized in that the said separating members consist of freely rotatable rollers, a rotatable platform being provided to receive the cans, the said rollers being mounted on said platform in a circle concentric with the rotational axis thereof, the said driving elements being formed as bell-cranks which are pivoted on said platform, there being also provided a stationary cam centrally disposed relative to said platform, the bell-cranks being acted upon by the said cam in such manner as to cause an arm of each bell-crank to rise from below the level of the platform to engage a can after the cans have been preliminarily separated by the said rollers, the said cam permitting the said arm of each bell-crank to drop below the level of the platform after the can has been driven by such arm along the said guideway, whereby to permit the reception on said platform of a line of cans between which there is initially no separation.

14. In a machine for seaming tops on cans, a rotatable spacing platform, a stationary spiral guideway above said platform, a plurality of bell-cranks carried by said platform adapted to oscillate in vertical radial planes, one arm of each of said bell-cranks being adapted to swing to an active position above the level of said platform so as to engage the side of a can resting thereon and propel the can along said guideway, the said arm in its inactive lower position being flush with or below the level of the platform, a central stationary cam below said platform and disposed so as to be engaged by a downwardly-projecting arm of each of said bell-cranks, the said cam causing the bell-cranks in their rotation with the platform to oscillate between the said inactive and active positions, and a plurality of freely rotatable separating rolls carried on said platform at a uniform radius from the center thereof, said rolls initially engaging between cans which are fed into said guideway and thereby effecting a preliminary separation of the cans such as to permit the rising of the said bell-crank arms into active driving engagement therewith.

15. In a machine for seaming tops on cans, a spacing table including a rotatable platform, a stationary guideway above said platform adapted to receive a line of cans at a point toward the center of said platform, and as the cans are carried around with the rotation of said platform, to move them radially outwardly, driving fingers rotating with said platform and adapted to drop below the level thereof where the cans are received and to rise behind the cans to propel the latter along said guideway, and a series of separating members rotating with said platform and moving through such an arc as to penetrate the line of cans fed to the platform and thereby initially separate said cans a sufficient distance to permit the rising between them of the said driving fingers.

In witness whereof, I have hereunto signed my name.

PETER KRUSE.